(12) United States Patent
McFarland et al.

(10) Patent No.: US 9,846,531 B2
(45) Date of Patent: Dec. 19, 2017

(54) INTEGRATION OF BUILDING AUTOMATION SYSTEMS IN A LOGICAL GRAPHICS DISPLAY WITHOUT SCALE AND A GEOGRAPHIC DISPLAY WITH SCALE

(71) Applicant: Siemens Industry, Inc., Alpharetta, GA (US)

(72) Inventors: Norman R. McFarland, Palatine, IL (US); Thomas Jachmann, Nuremberg (DE)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 505 days.

(21) Appl. No.: 14/326,531

(22) Filed: Jul. 9, 2014

(65) Prior Publication Data

US 2016/0011753 A1    Jan. 14, 2016

(51) Int. Cl.
*G06F 3/0484* (2013.01)
*G06F 3/0481* (2013.01)
*G06F 3/0482* (2013.01)
*G06F 17/30* (2006.01)

(52) U.S. Cl.
CPC ........ *G06F 3/04847* (2013.01); *G06F 3/0482* (2013.01); *G06F 3/04817* (2013.01); *G06F 17/30241* (2013.01); *G06F 17/30271* (2013.01)

(58) Field of Classification Search
CPC . G06F 3/04847; G06F 3/04817; G06F 3/0486
USPC .......................................................... 715/771
See application file for complete search history.

(56) References Cited

U.S. PATENT DOCUMENTS

| | | | | |
|---|---|---|---|---|
| 2005/0256852 | A1* | 11/2005 | McNall | G06F 17/30398 |
| 2013/0086497 | A1* | 4/2013 | Ambuhl | G05B 15/02 |
| | | | | 715/762 |
| 2014/0152651 | A1* | 6/2014 | Chen | G06T 19/003 |
| | | | | 345/419 |
| 2014/0304643 | A1* | 10/2014 | Holland | G06F 3/0481 |
| | | | | 715/781 |
| 2014/0325414 | A1* | 10/2014 | Park | G06F 3/04815 |
| | | | | 715/769 |

\* cited by examiner

*Primary Examiner* — Angie Badawi

(57) ABSTRACT

An approach for integrating logical graphics display (100) and geographic display system data (200) into building automation systems that allow users to navigate between the logical graphics displays and the geographic displays and to select the logical graphics displays and the geographic displays that are displayed on the displays to the users of the building automation systems.

20 Claims, 8 Drawing Sheets

INTEGRATION OF BUILDING AUTOMATION SYSTEMS IN A LOGICAL GRAPHICS DISPLAY WITHOUT SCALE AND A GEOGRAPHIC DISPLAY WITH SCALE

1. FIELD OF THE INVENTION

This application relates generally to the field of building automation systems, and more particularly to visual monitoring and control of building automation systems.

2. BACKGROUND

Building automation systems typically gather real-time data of building systems and present the information at an operations and maintenance center (OMC) so that an operator may monitor and control a building or facility. Examples of the real-time data that may be collected include operational states, events, alarms, and environmental sensor data, such as temperature, humidity, and light. This real-time data along with configuration data, i.e., data related to lights, thermostats, damper actuators, alarms, heating, ventilation, and air conditioning (HVAC) devices, sprinkler systems, speakers, door locks, and the like, may be stored in databases that are accessed by the OMC and displayed on a display. In general, a building automation system (BAS) generates and displays all of the information needed to monitor a building or facility and portions thereof.

The displaying of data at the OMC of a building automation system may occur in text reports and logical graphic displays of devices and points without scale (sometimes referred to as equipment graphics). In some known implementations, logical graphics display may be employed that resemble floor plans of a building with relative distance. The logical graphics display may be displayed in a computer windowing software environment that enables an input device such as a mouse to select devices depicted in the logical graphics display. Once selected, other windows may be opened that provide text or other information about the selected devices, such as events and alarms.

A known exemplary logical graphics display 100 of HVAC equipment on a computer display is shown in FIG. 1. The logical graphics display 100 depicts logical graphic icons (commonly referred to as "icons") representing without scale a number of devices that make up air handling unit 102 in a building. The term "without scale" means the devices are shown next to each other in the computer display, but in reality the devices may be spread across multiple rooms, floors, and even buildings. The air from the air handling unit 102 is provided from vents to a preconfigured area of the building/room 116. In order for the air in a building/room 116 not to get "stale," old air is removed (return air) from an area by exhaust vents as the new or recirculated air is provided (supply air) that enters the room 116.

The air handing unit 102 enables outside air 104 to enter the building 116. The outside air may pass through an outside air damper 106. The outside air damper 106 enables a portion of the outside air to pass, which mixes with return air. The mixed or supply air may pass through a supply air damper 108 and be conditioned prior to entering room 116. Air entering the room 116 is shown as passing by a temperature sensor 118, a humidity sensor 112, and through filter 120. A fan or source air mover 122 aids in moving the air. The air may pass through a source cooling coil 124 and/or source air heating coil 126. The supply or mixed air then enters room 116. The temperature sensor 118 and humidity sensor 112 typically would report their measurements back to the OMC continuously. In other implementations, the measurements may be reported back to the OMC periodically.

The air leaving room 116 is typically called return air and may pass through a return air damper 114. The return air may then divide between a path leading through the exhaust air damper 132 and eventually out of the building 130 and the mixed air damper 110.

The logical graphics display 100 may be displayed in a window 134 created by a window manager, such as MOTIF in LINUX™, or a windowing operating system, such as MICROSOFT® WINDOWs®. Typically a window may be moved within a display device or between display devices. Window 134 may also depict additional menus and buttons that may be used to control the window and items depicted in the display. A mouse input device (such as 234 shown in FIG. 3) may move a cursor in the logical graphics display 100 and select devices that make up the air handling unit, such as cooling coil 124. When selected, additional information associated with the cooling coil 124 may be displayed in the current window or a pop-up window. Color may be used in the logical graphics display 100 with each device depicted in the window having a green color for proper operation and red if an alarm or error condition exists. Additional colors or symbols may be employed to show the status of devices, such as switches "ON" or "OFF" and fans or vents "OPEN" or "CLOSED." An example of logical graphics display includes a logical graphic display of an APOGEE® Building Automation System made by Siemens Industry, Inc., Building Technologies Division.

Logical graphics display such as that of FIG. 1 are normally custom created, and are used to show the logical structure of various field devices, commonly known as "points," that may be found in any defined area or space of a building or other facility. In general, these field devices may be used for both environmental control purposes and security control purposes. In addition to logical graphics display icons, pop-up windows and drop-down menus that display real-time values indicating the status of the field devices, alarm lists related to equipment failure and violation of minimum/maximum values, etc., may be used in logical graphics displays. In general, an alarm is any status or state of a field device that requires notification to an operator of a BAS, such as an unsafe condition or a value outside a predetermined range. As an example, alarm lists may list all devices located in a building, with, for example, alarms indicated for temperatures above a maximum temperature in a red color, or vents open or closed in red or green, respectively.

Logical graphics display, however, lack scale or proportion between the individual field devices that are depicted, and do not include visualizations that show scale and distance of the individual field devices and their position within the building. More recently, Building Information Modeling (BIM) has been used in the design of buildings and other facilities, starting with the planning and design phase of a facility project and through the facility's construction and operation phases. In general, BIM refers to computer-aided design (CAD)-based software tools applied to the design, construction, operation, and maintenance of physical infrastructures. These software tools may be used by architects, mechanical/electrical/plumbing (MEP) engineers, structural engineers, and contractors to create their own BIM models that are then integrated into a single BIM model. The resulting single BIM model is able to generate realistic visualizations with scale that can be manipulated in whole or in part and individual components and assemblies that can be disassembled for further manipulation. A known exemplary geographic display 200 of the building space 202. is shown in FIG. 2, where 204 is a window in which the building space 202 is displayed.

BAS logical graphics displays and BIM-type visualization systems each have their advantages and disadvantages. The alarm lists of BAS logical graphics displays provide a good overall view of alarms, i.e., any condition of a field device requiring user intervention, that allow a quick selection of the critical alarms from multiple alarms in the alarms list and logical displays of information in screens that provide a clear and uncluttered overview. Also, today's users of BAS logical graphics display are typically familiar with these types of reporting and displays. Many current users of BASs are highly efficient in using them and these users are able to make decisions based on the logical relationship of the equipment depicted. A disadvantage is that the relative location of equipment is not clear in a logical graphics display, and therefore there is no display of proximity between equipment, rooms, locations of sensors, positions in a building, or distances between points; as an example, sensors and equipment providing heating/cooling may be located near windows, computers, servers etc. that may be adversely impacting the environment and sensors. Such information may be useful to a user in finding and resolving potential problems in the building.

As for BIM-type geographic display systems, their geographic displays are superior in displaying the (absolute and relative) position and proximity of devices such as, for example, all of certain devices in any given room or building. Decisions based on the relative and absolute position of equipment can easily and correctly be made. The disadvantages are that if the individual pieces of equipment are connected, e.g., part of a cooling/heating system, such decisions may not be made so easily because of the equipment may not appear in the visualization. Other disadvantages are that in a geographic display of information it may be more difficult to see the complete logical system because of the amount of information and location of all of a particular type of device, e.g., fire and security alarms and temperature sensors. Other significant disadvantages are the costs and training required to use BIM-type geographic display systems properly and the fact that there are many older, pre-existing facilities designed without using BIM systems. Further, BIM design capabilities typically cannot be easily incorporated into these pre-existing facilities.

Therefore, what is needed in the art is an approach that combines and synchronizes BAS information and BIM-type information that can be displayed at an OMC and that also enables a user to select the information he needs to view from each type of information.

SUMMARY

In accordance with one embodiment of the disclosure, a building automation system (BAS) for a building is described comprising a controller that accesses a database having data associated with a plurality of BAS devices and a plurality of areas in the building. The data comprises BAS logical graphics display data that may be displayed as icons representing field devices, alarm lists, and other items, and geographic display systems data that may be displayed as elements and devices in scale relationship to each other. The logical graphics display and the geographic display systems data may be synchronized by identifying and linking common elements and devices of the logical graphics data and the 3D data and associating the corresponding logical graphics display and geographic display systems data for display when elements or devices of either display are selected by a user.

In a method of operation, a user is able to view simultaneously both logical graphics display and geographic display systems data either on separate displays or in separate windows of a single display. An integrated logical graphics display and geographic display controller (i.e., integrated display controller) in accordance with the invention allows the user to select a single field device shown in the logical graphics display on a first display or all field devices of a particular type of field device, or by using a cursor, outlining several field devices or a portion of the building displayed, and then by issuing a command to the integrated display controller, causing the selected items to be displayed in the geographic display on the second display. Similar selection options may be utilized with respect to alarm lists, i.e., either single, multiple, or all alarms may be selected, or only alarms of a certain status defined by severity, state, age, etc., and a corresponding geographic display may be generated on the second display. Conversely, the user may make similar selections with respect to geographic display on the second display and generate the corresponding logical graphics display on the first display.

In another method of operation, the integrated display controller may improve the readability of the various displays by a reduction of the information displayed through filtering and fading. As an example, when a user selects several field devices in a geographic display, the non-selected field devices depicted in the resultant logical graphics display may be displayed as "faded" or "ghosted" elements so as to allow the user to focus on the selected field devices while visually maintaining the logical connection between the selected devices that are shown in the logical graphics display. In other examples, non-selected elements may be entirely omitted or hidden, as in the scenario where the user wishes to view an alarm list for a selected room displayed in a geographic display system and the only alarms listed are those that are directly related to the selected room.

The above described features and advantages, as well as others, will become more readily apparent to those of ordinary skill in the art by reference to the following detailed description and accompanying drawings. The graphical information in the building automation system teachings disclosed herein extend to those embodiments that fall within the scope of the appended claims, regardless of whether they accomplish one or more of the above-mentioned advantages.

DESCRIPTION

An example approach for integration of building information models and building automation systems is presented. In the example, an operations and maintenance center is employed to monitor and control building automation systems.

Figure 3:
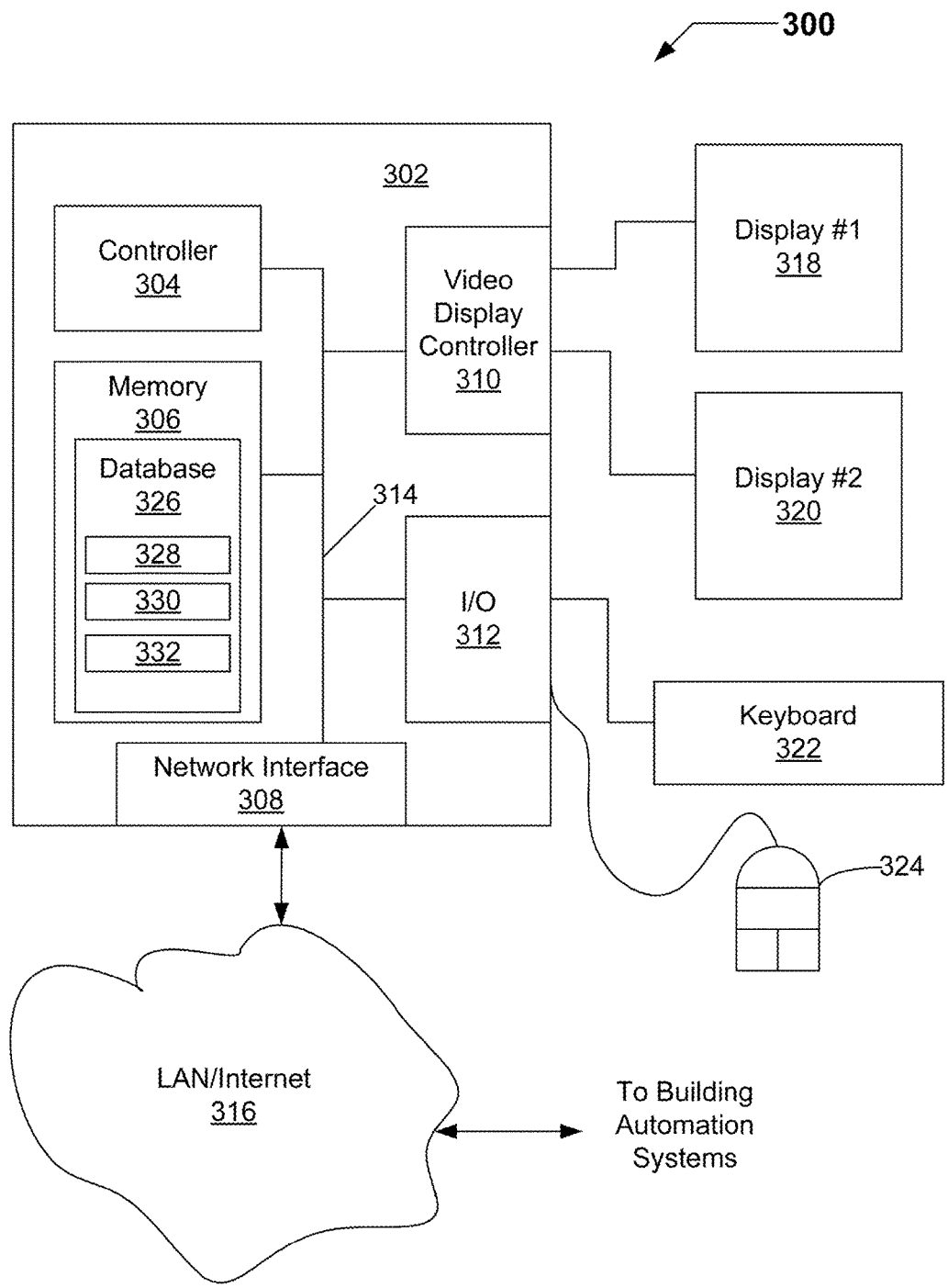
FIG. 3 is a block diagram of an OMC of a BAS in accordance with an example implementation of the invention.

With reference to FIG. 3, a block diagram 300 of an operation and maintenance center (OMC) 302 of a building automation system (BAS) in accordance with an example implementation of the invention is depicted. The OMC 302 may have a controller 304 coupled to a memory 306, network interface 308, video controller 310, and input/output (I/O) interface 312 by address/data bus 314. The network interface 308 may couple the OMC 302 to a network, such as one or more local area networks (LANs)/internet 316, or a proprietary building automation system network. The connection to the LANs/internet 316 may be wired or wireless (such as 802.11g or 802.11n). The video controller 310 may be coupled to one or more displays, such as display #1 318 and display #2 320. The displays are typically digital video displays, such as HD televisions or VGA computer displays. The I/O interface 312 may be coupled to a keyboard 322 and mouse 324.

The models of the BAS and building layout may be contained in database 326, which may include logical graphics display database 328, 3D data database 330, and BAS data database 332. 3D data database 330 may store data compatible with 3D modeling software such as Datacenter Clarity LC™ commercially available from Siemens Industry, Inc., Building Technologies Division. Examples of databases that may be employed in OMC 302 include SQL and Microsoft Access.

Figure 4A:
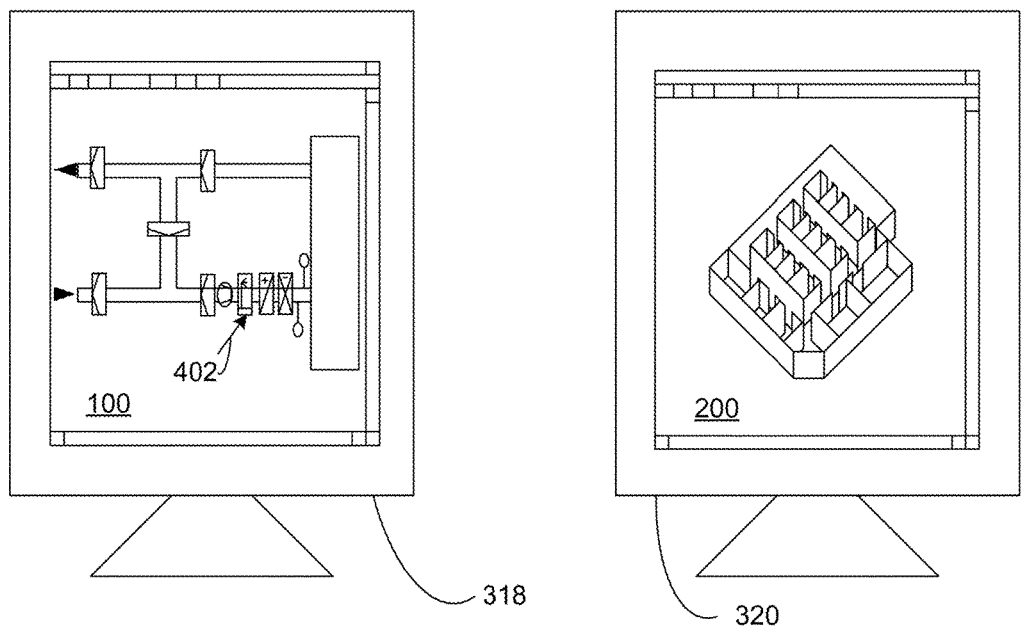
FIG. 4A is an exemplary depiction of an OMC of FIG. 3 displaying both logical graphics display and geographic display in accordance with an example implementation of the invention.

The controller 304 may execute instructions that may be stored in memory 306 that facilitate the operation of the OMC 302. The OMC 302 is able to configure the BAS, receive events and alarms, and generate reports. Information and reports may be displayed on display #1 318 and/or display #2 320, such as logical graphics display 100 on display 318 and geographic display system data 200 on display 320, respectively, as shown in FIG. 4A.

The association between field devices and other elements in the logical graphics display 100 and the geographic display system data 200 may be entered into the databases 328 and 330, respectively, during commissioning of the BAS; such mapping/associating may be referred to as static. In other implementations, the associations may be entered after the system is commissioned, such as with an existing system. In general, each field device and each other element may be assigned a unique identifier that may include codes related to path, location, type, etc., which may be used by the controller 304 to navigate back and forth between logical graphics display and geographic display as directed by the user.

In yet other implementations, dynamic association may be employed, where the mapping between the logical graphics display 100 and geographic display system data 200 occurs dynamically when a field device or area is selected. For example, if a cooling coil 124 is selected in the logical graphics display 100, the points or devices associated with that field device are identified. The temperature sensor 118 is known to be associated with the cooling coil 124 and therefore may have a corresponding position in the geographic display system data 200. The OMC 302 dynamically may also associate the room closest to the temperature sensor 118 with the cooling coil 124 and other field devices associated with the air handling unit 102. In yet other types of installations, the association may be made as the BAS is used.

In contrast to associating additional related elements to a selected field device or other element, the OMC 302 may improve the readability of the various logical graphics and geographic displays by reducing the information displayed by filtering and/or fading out unnecessary elements. As an example, when a user selects several field devices in a geographic display, there may be several non-selected field devices depicted in the resultant logical graphics display that may detract from the overall utility of the logical graphics display. In another embodiment, the user may issue a command to the I/O interface 312, such as, for example, "fade," and the controller 304 will then "fade out" or "ghost" the unnecessary elements so that the logical connection between the selected devices that are shown in the logical graphics display will be visually maintained.

In other examples, non-selected elements may be entirely omitted or hidden from view, as in the scenario where the user wishes to view an alarms list for a selected room displayed in a geographic display system and the only alarms listed are those that are directly related to the selected room. These and other techniques may be implemented automatically by the controller 304 or may be initiated by commands from the user input through I/O interface 312.

Figure 1:
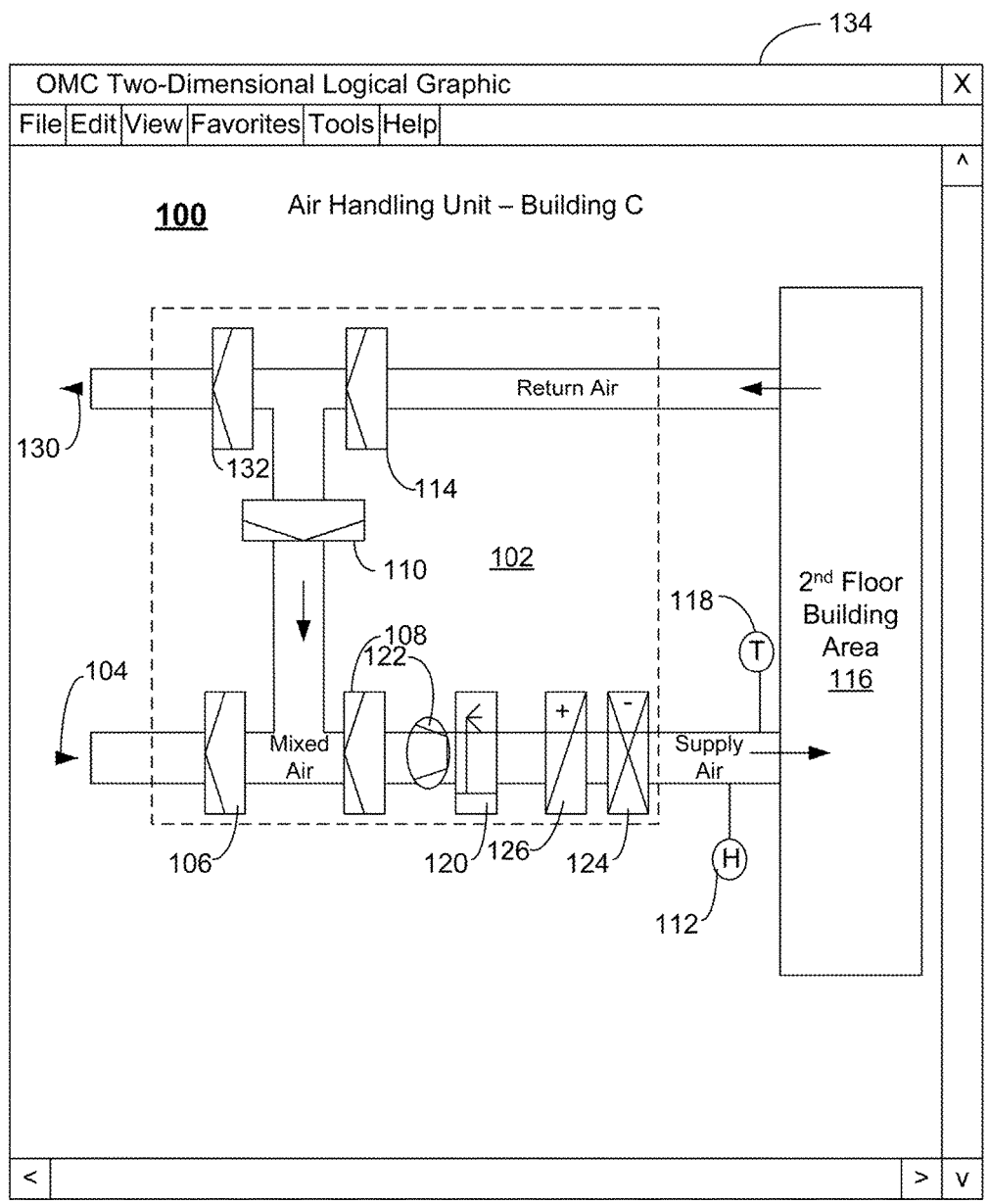
FIG. 1 is a known exemplary two-dimensional logical graphic representation of HVAC equipment that may appear on a display of an operation and maintenance center (OMC) of a building automation system (BAS)
Figure 2:
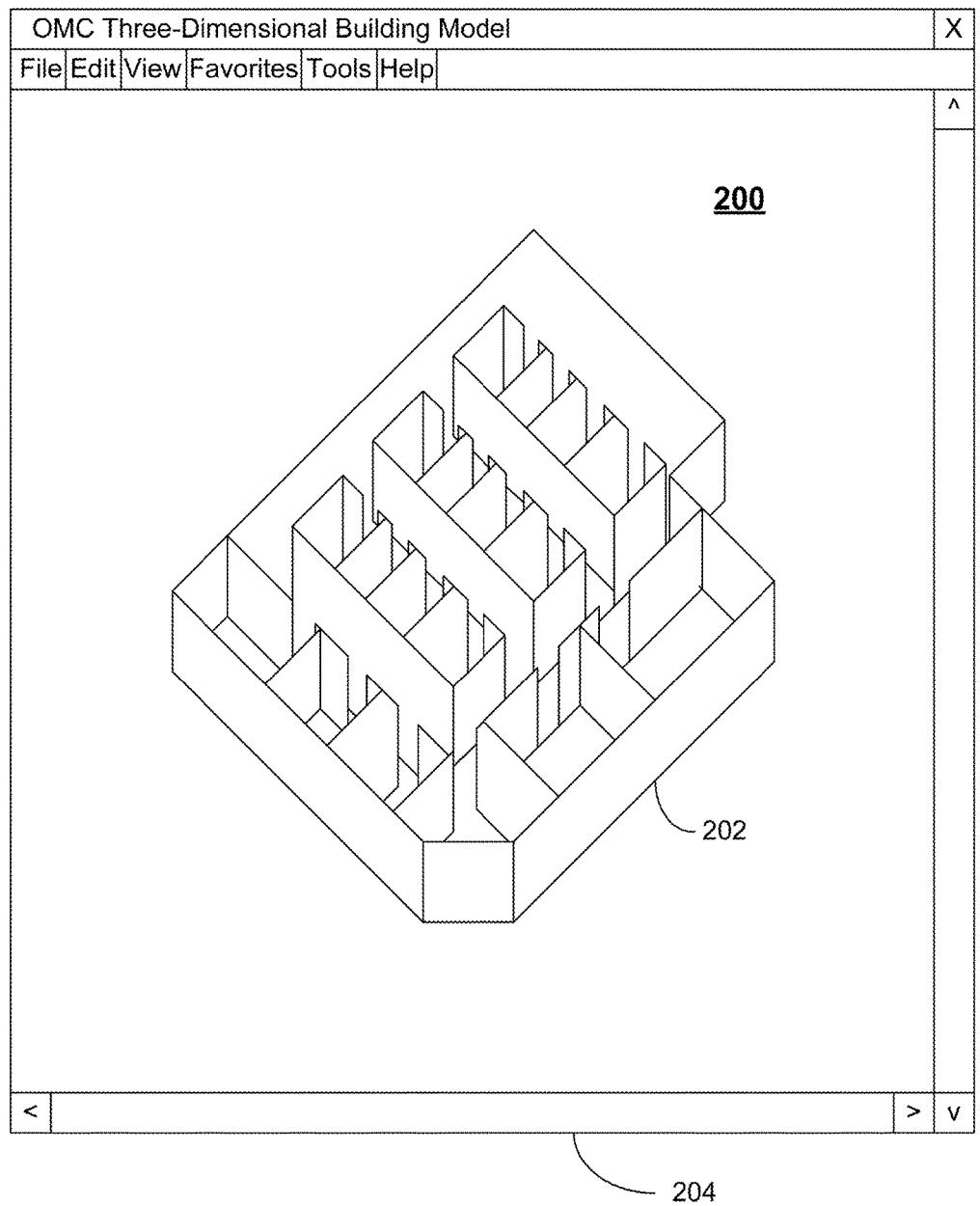
FIG. 2 is a known exemplary three-dimensional drawing of the building space affected by the HVAC equipment of FIG. 1.

Turning to FIG. 4a, an exemplary depiction of two displays 318 and 320 coupled to the OMC 302 of FIG. 3 displaying, respectively, the logical graphics display 100 of FIG. 1 and geographic display data 200 of FIG. 2 in accordance with an example implementation of the invention is shown. As the device in the logical graphics display 100 is selected (e.g., cooling coil 124) using a cursor 402 controlled by the mouse 324, a corresponding image of the area of the building affected by the cooling coil 124 is depicted in the geographic display system data 200. Additional information or operations may also be provided with pull-down menus or pop-up windows.

Additional operations may include sending notifications to users who are associated with the area in the building affected by the failure of cooling coil 124. The 3D model may have the individuals associated with the cubicles and offices located in the area identified as affected by the cooling coil 124. By using that association, the OMC 302 may send an email or text message to those users affected by the failure. This is an improvement over the current approach of notifying users based on predefined mailing groups that exist in and have to be maintained in the messaging software. In other implementations, smart thermostats or other messaging systems may be employed by the OMC 302 to provide feedback or notification of events and failures.

Figure 4B:
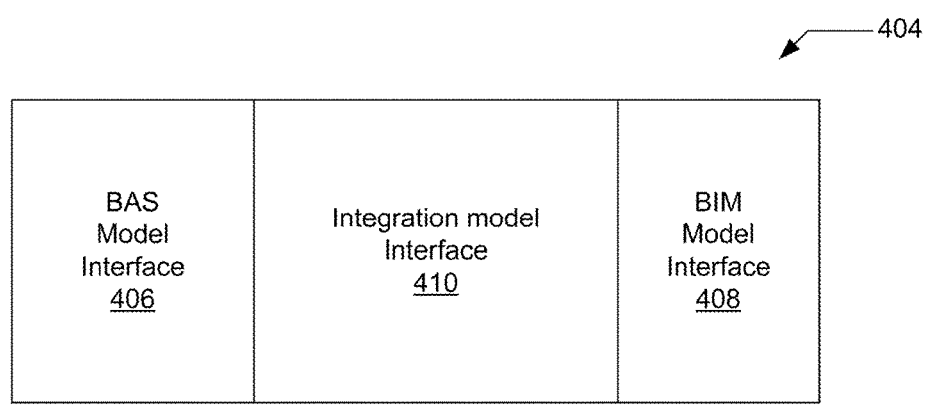
FIG. 4B is a block diagram of the integration model interface between a logical graphics display and the geographic display of FIG. 4a in accordance with an example implementation of the invention.

FIG. 4B is a block diagram 404 of the integration model interface 410 between a logical graphics display 100 and the geographic display 200 of FIG. 4a in accordance with an example implementation of the invention. The integration model interface 410 provides the interface between the building automation system (BAS) model interface 406 and the building information model (BIM) interface 408. When an object is selected in one of the models (either the BAS model or BIM model), an associated selection occurs in the other model at the direction of the integration model interface. Since humans can only handle so much information, filtering is done by the integration model interface 410 to show or highlight subsets of information, such as a room or floor that is primarily serviced by a device selected in the logical display. Furthermore, drop down menus or other types of selections may be used to make more specific selections, such as devices in an alarm state associated with an air handler. Another approach to limiting or filtering information displayed may include fading or ghosting. Items not desired may be depicted as ghosted or less pronounced in the display.

Figure 5:
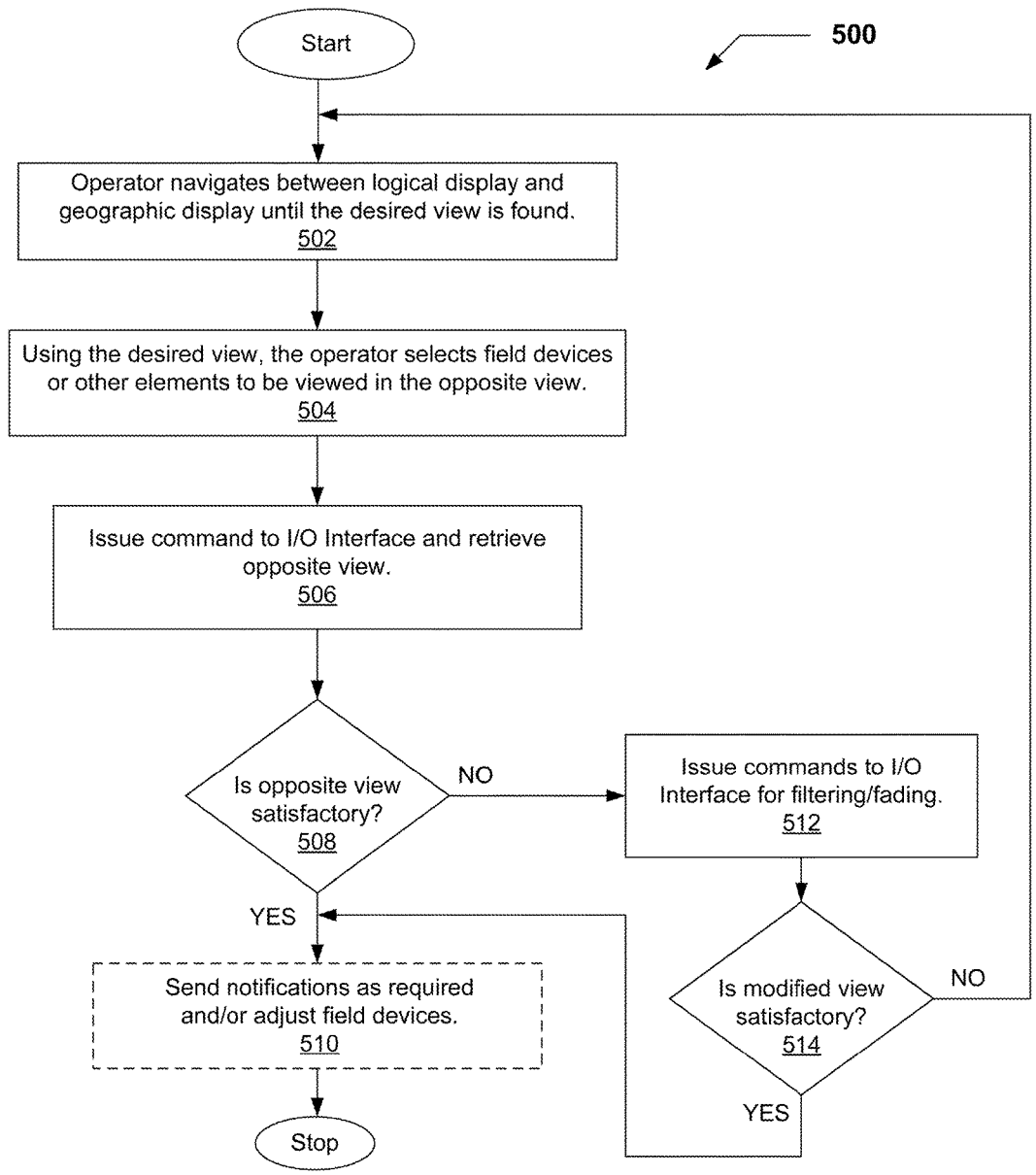
FIG. 5 is a flow diagram of a method of operation of the OMC of FIG. 3 with both the logical graphics display and geographic display being employed by an operator in accordance with an example implementation of the invention.

FIG. 5 is a flow diagram 500 of the operation of the OMC 302 with both the logical graphics display 100 of FIG. 1 and geographic display 200 of FIG. 2 being available to a user in accordance with an example implementation of the invention. Databases 326 and 328 have been provided with the required logical graphics display data and geographic display data, respectively. Additionally, data that identifies the location of the field devices and the areas or rooms in the building affected by the operation of the field devices may be stored in the database 332.

In step 502, an operator of the OMC 302 using the keyboard 322 or mouse 324 (an input device) may navigate between a logical graphics display and a geographic display until he finds the display with the information and/or visualization he was seeking. For example, the operator may issue the command "Navigate in geographic display" to the OMC 302 and thus retrieves the so-called "desired view," which is a geographic displayed visualization. In step 504, the operator selects elements depicted in the desired view for viewing in the other modeling system, e.g., logical graphics display if a geographic display is the desired display and vice versa. As an example, the operator may select cooling units for display in a geographic display 200 or alarm lists for display in a logical graphic display 100.

The operator may issue another command and retrieve the "opposite view" in step 506. In decision step 508, the operator determines if he has obtained the desired results. If he has, in step 510 the operator may send out any required notifications or messages and also make any required adjustments to the displayed field devices, after which the process 500 terminates. If the "opposite" view is not satisfactory to the operator, in step 512 he may apply other techniques to improve the results. These techniques include further filtering, i.e., removing certain elements to clarify the displayed views, or fading certain elements, which may also clarify the displayed views. It is appreciated by those skilled in the art that these techniques may be applied automatically by the OMC 302 or may be initiated by the operator by way of commands to the I/O interface 312.

If in decision step 514, the operator determines that he has not obtained the desired results, the process returns to step 502, where the process 500 starts anew, with operator navigating between the logical graphics display and the geographic display until he finds a better display with the information and/or visualization he was seeking so that he is able to complete the task he has undertaken.

If two displays (318 and 320) are coupled to the OMC 302, one display may present the logical graphics display 100 in a window while the other display presents the geographic display system data 200 in another window. If only one display is coupled to the OMC 302, then each window may be displayed next to each other or one on top of the other.

Figure 6:
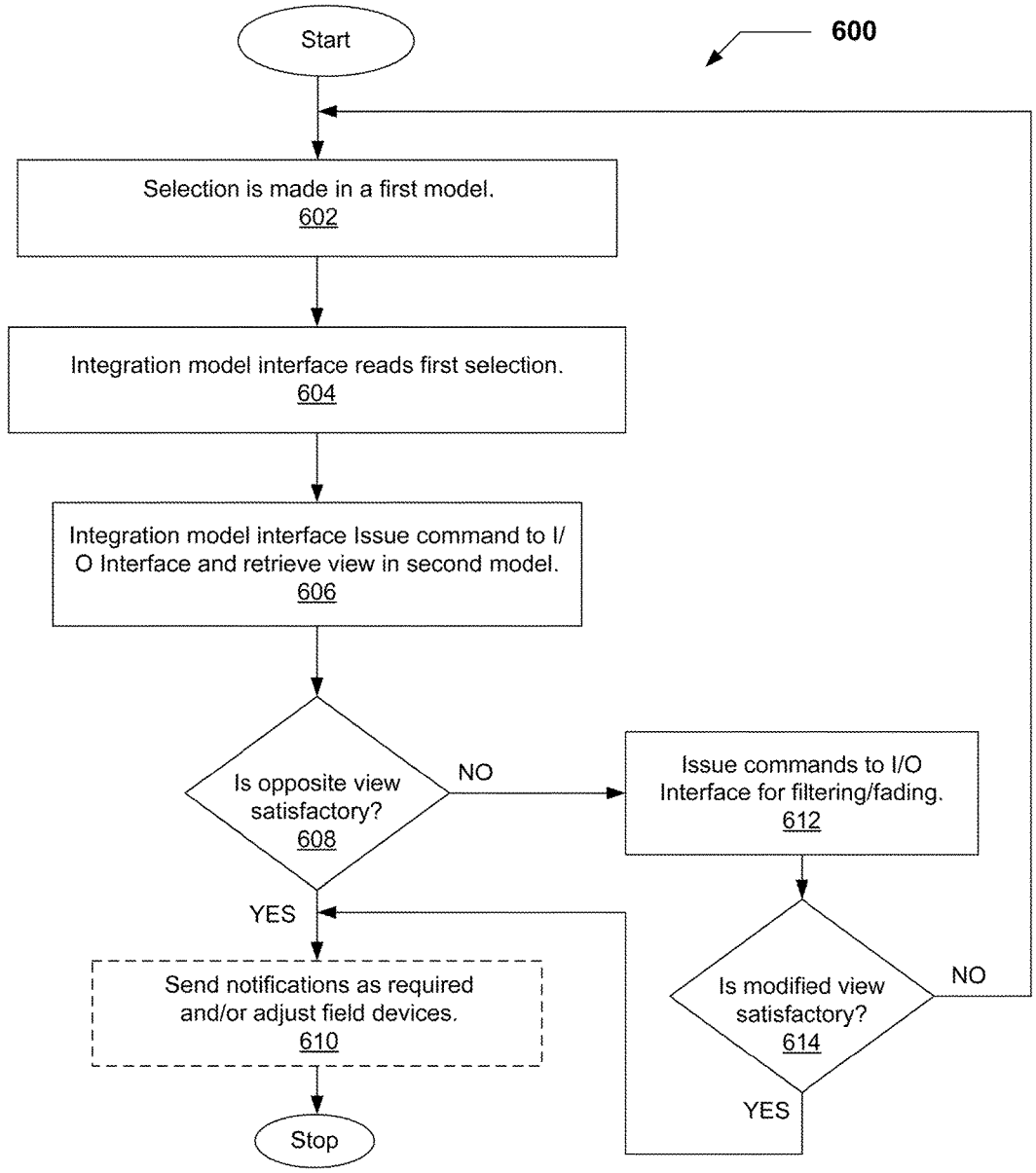
FIG. 6 is a flow diagram of a method of operation of the integration model interface of FIG. 4B in accordance with an example implementation of the invention.

Turning to FIG. 6, a flow diagram 600 of a method of operation of the integration model interface of FIG. 4B is depicted in accordance with an example implementation of the invention. A selection is made in the first model, such as the BAS model depicted in a logical display 602. The integration model interface reads the first selection 604 and retrieves associated data and issues a command to the I/O interface and retrieves an associated view in the second model 606, such as the BIM displayed as the geographic display. The opposite view (view in the second model) may be further refined via filtering if the view is not satisfactory 608. The integration model interface reads a filtering request and issues commands to the I/O interface for filtering/fading 612. If the modified (filtered/fading) view is satisfactory 614, then additional control of the remote devices may occur, such as sending notifications as required and/or adjust field devices 610. Otherwise if the view is not satisfactory 614, then a different selection in the first model may occur 602.

Figure 7A:
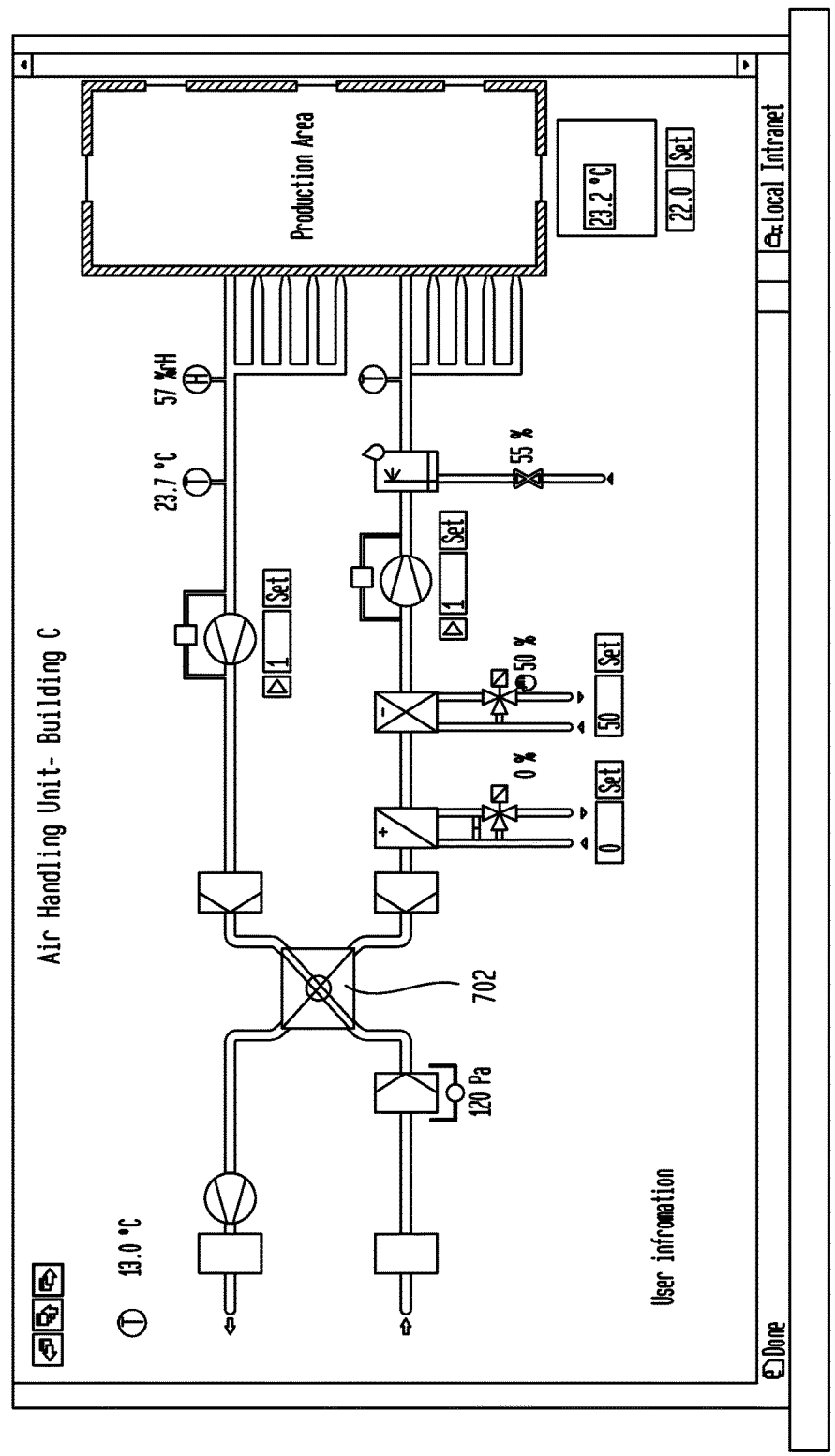
FIGS. 7A and 7B are an exemplary depiction of the OMC of FIG. 3 displaying both a logical graphics display and a geographic display system in accordance with an example implementation.
Figure 7B:
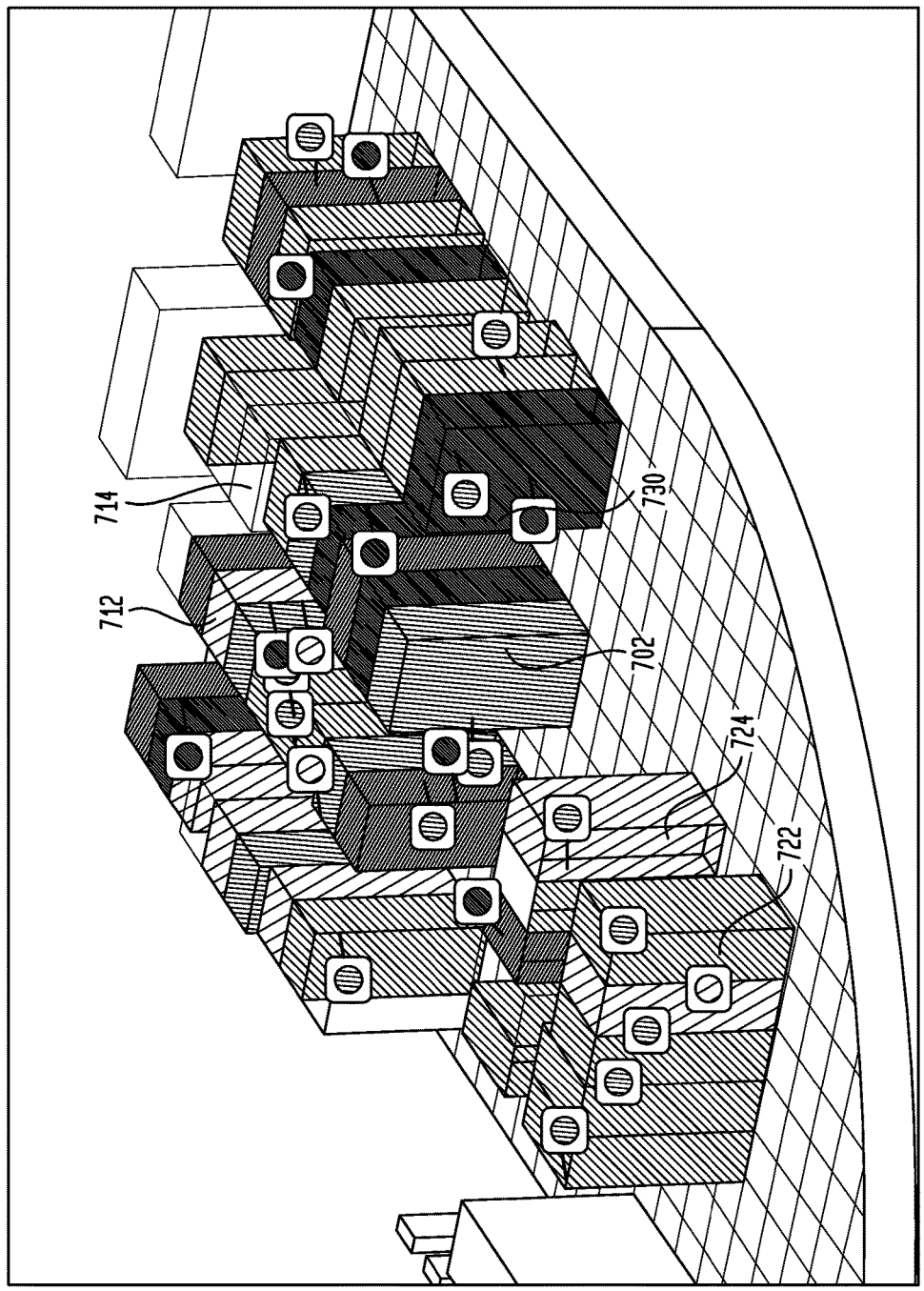

In FIG. 7A, a logical graphics display (e.g., 100) of an air handler with air exchanger 702 displayable on display #1 318 is depicted. The logical graphics display is associated with a geographic display (e.g., 200) of a server room having multiple servers, such as servers 702, 712, 714, 724, 722, 730 in FIG. 7B displayed on display #2 320. Some of the servers are in alarm condition, such as 724 and 712. If the alarm condition is related to temperature, then the HVAC equipment that supports and is associated with the server room may be displayed. The equipment may be filtered, so only the air handling equipment is depicted as shown in FIG. 7A. Thus, the air exchanger 702 may be rapidly identified and air paths checked for alarms or faults.

It will be understood, and is appreciated by persons skilled in the art, that one or more processes, sub-processes, or process steps described in connection with FIGS. 1-7A and 7B may be performed by hardware and/or software (machine readable instructions). If a server is described (OMC may be implemented as a server), the term "server" may mean a combination of hardware and software operating together as a dedicated server or it may mean software executed on a server to implement the approach previously described. If the process is performed by software, the software may reside in software memory (not shown) in a suitable electronic processing component or system such as one or more of the functional components or modules schematically depicted in the figures.

The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any tangible means that may contain or store the program for use by or in connection with the instruction execution system, apparatus, or device. The tangible computer-readable medium may selectively be, for example, but is not limited to, an electronic, magnetic, optical, electromagnetic, infrared, or semiconductor system, apparatus or device. More specific examples, but nonetheless a non-exhaustive list, of tangible computer-readable media would include the following: a portable computer diskette (magnetic), a random access memory (RAM) (electronic), a read-only memory (ROM) (electronic), an erasable programmable read-only memory (EPROM or Flash memory) (electronic) and a portable compact disc read-only memory (CDROM) (optical). Note that the computer-readable medium may even be paper (punch cards or punch tape) or another suitable medium upon which the instructions may be electronically captured, then compiled, interpreted or otherwise processed in a suitable manner if necessary, and stored in a computer memory.

The foregoing detailed description of one or more embodiments of the integration of building information models and building automation systems has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

The invention claimed is:

1. A building automation systems (BAS) operation and maintenance center (OMC) for a building, comprising:
a processor coupled to at least one display device, at least one input device, and a memory having a first database storing logical graphics display data and a second database storing geographic display system data, wherein the first database and the second database are synchronized with each other, wherein the processor is configured to cause:
the at least one display device to output in a first window a logical graphics display based on the logical graphics display data, which logical graphics display shows icons representing field devices in a schematic diagram without a scale that depicts proportions for distances between individual icons that correspond to proportions for distances between field devices in the BAS; and
the at least one display device to output in a second window a geographic display based on the geographic display system data, which geographic display shows field devices in a visualization of a portion of the building with a scale that depicts proportions for distances between individual field devices in the visualization that corresponds to proportions for distances between field devices in the building depicted by the visualization,
wherein the at least one of the field devices shown in the geographic display is shown in the logical graphics display,
wherein the logical graphics display is outputted responsive to a selection by an operator through the at least one input device of the at least one field device in the geographic display, or the geographic display is outputted responsive to a selection by an operator through the at least one input device of the at least one field device in the logical graphics display, whereby an operator is enabled to navigate between data in the first database and the second database.

2. The BAS OMC of claim 1, wherein the logical graphics display comprises schematic floor plans, icons representing field devices, and alarm lists.

3. The BAS OMC of claim 2, wherein the geographic display system data in the first database is annotated with logical graphics display alarm lists and icons representing field devices in the second data base.

4. The BAS OMC of claim 1, wherein the at least one field device includes a component of a heating, ventilation, and air conditioning system.

5. The BAS OMC of claim 4, wherein the geographic display displayed in the second window is generated responsive to an operator of the OMC selecting the at least one field device in the first window.

6. The BAS OMC of claim 4, wherein the logical graphics display displayed in the first window is generated responsive to the operator of the OMC selecting the at least one field device in the second window, wherein the processor is configured to display field devices shown in the first window other than the selected at least one field device as faded relative to the display of the selected at least one field device in the first window.

7. The BAS OMC of claim 1, wherein the first window and the second window are displayed to an operator of the OMC in separate display devices.

8. The BAS OMC of claim 1, wherein the first window and the second window are displayed to the operator of the OMC in a single display device.

9. A method of operating a building automation system (BAS) operation and maintenance center (OMC) for a building, comprising:
through operation of at least one processor:
accessing at least one database in a memory logical graphics display data having logical graphics associated with a plurality of BAS devices located within a plurality of areas of the building;
based on the accessed logical graphics display data generating through at least one display device in a first window a logical graphics display having icons in a schematic diagram associated with at least a portion of the plurality of BAS devices located within an area of the building without a scale that depicts proportions for distances between individual icons that correspond to proportions for distances between BAS devices in the building;
receiving through at least one input device a selection of at least one icon displayed in the first window;
responsive to the selection of the at least one icon, accessing from the at least one database geographic display system data; and
based on the accessed geographic display system data generating through the at least one display device in a second window a geographic display that displays the BAS devices represented by the at least one icon in a visualization of a portion of the building with a scale that depicts proportions for distances between individual BAS devices in the visualization that corresponds to proportions for distances between BAS devices in the building depicted by the visualization.

10. The method of claim 9, wherein the BAS devices include components of a heating, ventilation, and air conditioning system.

11. The method of claim 10, further comprising through operation of the at least one processor:
receiving through the at least one input device a selection of at least one BAS device in the geographic display in the second window;
responsive to the selection of the at least one BAS device in the geographic display, accessing from the at least one database logical graphics data; and
based on the accessed logical graphics data generating through the at least one display device in the first window a logical graphics display that displays an icon corresponding to the selected BAS device with other icons associated with at least a portion of the plurality of BAS devices located within an area of a schematic floor plan of the building without a scale that depicts proportions for distances between individual icons that correspond to proportions for distances between BAS devices in the building depicted by the schematic floor plan.

12. The method of claim 9, further comprising through operation of the at least one processor displaying the other icons as faded relative to the display of the icon corresponding to the selected BAS device in the geographic display.

13. A non-transitory computer readable medium encoded with executable instructions that when executed, cause at least one processor to carry out a method for an integration model interface in a building automation system including at least one database that stores logical graphics display data and geographic display system data, comprising:
through operation of the at least one processor:
causing at least one display device to output in a first window a logical graphics display based on the logical graphics display data, which logical graphics display shows icons representing field devices in a schematic diagram without a scale that depicts proportions for distances between individual icons that correspond to proportions for distances between field devices in the building automation system; and
causing the at least one display device to output in a second window a geographic display based on the geographic display system data, which geographic display shows field devices in a visualization of a portion of a building with a scale that depicts proportions for distances between individual field devices in the visualization that corresponds to proportions for distances between field devices in the building depicted by the visualization, wherein the at least one of the field devices shown in the geographic display is shown in the logical graphics display,
wherein the logical graphics display is outputted responsive to a selection by an operator through the at least one input device of the at least one field device in the geographic display, or the geographic display is outputted responsive to a selection by an operator through the at least one input device of the at least one field device in the logical graphics display, whereby an operator is enabled to navigate between data in the first database and the second database.

14. The computer readable medium of claim 13, wherein the logical graphics display comprises schematic floor plans, icons representing field devices, and alarm lists.

15. The computer readable medium of claim 14, wherein the geographic display system data is annotated with logical graphics display alarm lists and icons representing field devices.

16. The computer readable medium of claim 13, wherein the at least one field device includes a component of a heating, ventilation, and air conditioning system.

17. The computer readable medium of claim 16, wherein the geographic display displayed in the second window is generated responsive to the operator of the OMC selecting the at least one field device in the first window.

18. The computer readable medium of claim 16, wherein the logical graphics display displayed in the first window is generated responsive to the operator of the OMC selecting the at least one field device in the second window, wherein through operation of the at least one processor causing the display field devices shown in the first window other than the selected at least one field device as faded relative to the display of the selected at least one field device in the first window.

19. The computer readable medium of claim 13, wherein the first window and the second window are displayed to an operator of the OMC in separate display devices.

20. The computer readable medium of claim 13, wherein the first window and the second window are displayed to the operator of the OMC in a single display device.

* * * * *